United States Patent
Salarian et al.

(10) Patent No.: US 11,763,814 B2
(45) Date of Patent: Sep. 19, 2023

(54) HYBRID VOICE COMMAND PROCESSING

(71) Applicant: Logitech Europe S.A., Lausanne (CH)

(72) Inventors: Arash Salarian, Dubendorf (CH); Milos Cernak, Martigny (CH); Pablo Mainar, Lausanne (CH); Jean-Michael Chardon, Lausanne (CH); Niccolò Antonello, Castelfranco Veneto (IT)

(73) Assignee: Logitech Europe S.A., Lausanne (CH)

( * ) Notice: Subject to any disclaimer, the term of this patent is extended or adjusted under 35 U.S.C. 154(b) by 136 days.

(21) Appl. No.: 17/353,678

(22) Filed: Jun. 21, 2021

(65) Prior Publication Data
US 2022/0406305 A1    Dec. 22, 2022

(51) Int. Cl.
*G10L 15/32*  (2013.01)
*G10L 15/22*  (2006.01)
*G10L 15/10*  (2006.01)

(52) U.S. Cl.
CPC ............. *G10L 15/22* (2013.01); *G10L 15/10* (2013.01); *G10L 15/32* (2013.01); *G10L 2015/223* (2013.01)

(58) Field of Classification Search
CPC ................................ G10L 15/32; G10L 15/30
See application file for complete search history.

(56) References Cited

U.S. PATENT DOCUMENTS

| | | | |
|---|---|---|---|
| 7,228,275 B1 * | 6/2007 | Endo | G10L 15/32 704/235 |
| 9,171,541 B2 | 10/2015 | Kennewick | |
| 2006/0028337 A1 * | 2/2006 | Li | H04N 21/42203 340/539.1 |
| 2012/0259623 A1 * | 10/2012 | Dragosh | H04M 3/4936 704/201 |

OTHER PUBLICATIONS

Bourlard, et al., "Connectionist Speech Recognition: A Hybrid Approach", The Kluwer International Series in Engineering and Computer Science, Oct. 1993, 5 pages.
Bourlard, et al., "Optimizing Recognition and Rejection Performance in Wordspotting Systems", Proceedings of ICASSP '94. IEEE International Conference on Acoustics, Speech and Signal Processing, Apr. 19-22, 1994, pp. I-373-I-376.
Cernak, "Hybrid Speech Processing Systems: A White Paper", Logitech CTO office, Jul. 18, 2018, 5 pages.

(Continued)

*Primary Examiner* — Feng-Tzer Tzeng
(74) *Attorney, Agent, or Firm* — KILPATRICK TOWNSEND & STOCKTON LLP

(57) ABSTRACT

Digitized audio command is decoded to generate audio features. An in-domain confidence score is calculated for a model trained by a limited set of peripheral device commands. An out-domain confidence score is calculated for a model trained without the peripheral device commands. The best score determines whether to process the audio locally or at a remote server. In some embodiments, a likelihood ratio (LR) is calculated of the in-domain and out-domain confidence scores. Based on the likelihood ratio, a locally decoded audio command is performed, or the audio features are sent to a remote server for processing to determine the audio command.

20 Claims, 10 Drawing Sheets

(56) References Cited

OTHER PUBLICATIONS

Gruenstein, et al., "A Cascade Architecture for Keyword Spotting on Mobile Devices", 31st Conference on Neural Information Processing Systems (NIPS 2017), Dec. 10, 2017, 4 pages.
Jelinek, "Continuous Speech Recognition by Statistical Methods", Proceedings of the IEEE, vol. 64, No. 4, Apr. 1976, pp. 532-556.
Mohri, et al., "Speech Recognition with Weighted Finite-State Transducers", Springer Handbook of Speech Processing, Jan. 2008, pp. 559-583.
Pearce, "Enabling New Speech Driven Services for Mobile Devices: An overview of the ETSI standards activities for Distributed Speech Recognition Front-ends", AVIOS 2000: The Speech Applications Conference, May 22-24, 2000, 12 pages.
Povey, et al., "The Kaldi Speech Recognition Toolkit", Speech Recognition, Available Online at: https://www.researchgate.net/publication/228828379_The_Kaldi_speech_recognition_toolkit, Dec. 2011, 4 pages.
Teerapittayanon, et al., "Distributed Deep Neural Networks over the Cloud, the Edge and End Devices", 2017 IEEE 37th International Conference on Distributed Computing Systems (ICDCS), Jul. 17, 2017, 12 pages.
Xu, et al., "Minimum Bayes Risk Decoding and System Combination Based on a Recursion for Edit Distance", Computer Speech and Language, vol. 25, No. 4, Oct. 2011, pp. 802-828.
Tang "Hybrid Arbitration using raw ASR string and NLU information—taking the best of both embedded world and cloud world" Nuance Communications, Bellevue, Washington, 2019, pp. 2983-2987.

* cited by examiner

HYBRID VOICE COMMAND PROCESSING

BACKGROUND

The present invention relates generally to apparatus and methods for on-device automatic speech recognition (ASR) using a limited command set—a command spotter.

Unless otherwise indicated herein, the materials described in this section are not prior art to the claims in this application and are not admitted to be prior art by inclusion in this section. In particular, disparate technologies are discussed that it would not be obvious to discuss together absent the teachings of the present invention.

Voice interfaces are used to control many home devices. One example is controlling a smart speaker system using vocal commands such as "hey Logi, next track". Basically, the voice interface process has 3 parts: (1) Wake-word detection is used to reduce the chances of spurious activation of the system as well as to conserve energy. Due to the stringent requirements, namely high accuracy and low power consumption, typically the operation of this part of the system is independent of the rest of the speech processing part. (2) Speech processing is activated once the wake-word is detected. The main task of this part is to map audio captured from the microphone to an internal representation that can then be processed by the rest of the system. In many systems this representation is simply the text, corresponding to the utterance of the user. In many systems an Automatic Speech Recognition (ASR) system is used in this step. (3) Action—The task of this part of the system is to map the input representation of the voice command (e.g. the text) to the suitable action.

With regard to (2), in some current systems, the speech processing is performed entirely in a cloud backend, rather than the device itself. This choice offers many advantages as typically the processing power of the embedded systems are much more limited compared to the cloud backend. In some systems, however, all of the speech processing is performed in the device itself. This approach, however, is subject to the limitations of the embedded system's hardware capabilities, thus requiring a limited vocabulary size and limited complexity of the voice commands.

One approach to speech recognition uses Hidden Markov Models (HMM), a statistical Markov model in which the system being modeled is assumed to be a Markov process. Hidden Markov models are a useful tool in the modeling of a sequence of data. In particular, they have been successfully applied to voice recognition to detect phones and phonemes. In phonetics and linguistics, a phone is any distinct speech sound or gesture, regardless of whether the exact sound is critical to the meanings of words. In contrast, a phoneme is a speech sound in a given language that, if swapped with another phoneme, could change one word to another.

Hidden Markov models (HMMs) are a particular kind of a Bayesian network obtained by combining a Hidden Markov layer and a second layer of outputs that depends probabilistically on the hidden states of the first layer. For the English language, for example, for two hidden states, the basic division among vowels and consonants is the most natural basic pattern. As many more states are taken into account, it reveals a structure including the initial and final letters of a word, vowel followers and preceders, etc.

The Markov process is characterized by a sequence of internal states. The transition among these states is performed according to the probabilities of a transition matrix. A sequence of observations is then provided. The objective is to find a model that provides the best fit of the observation data. The standard technique in HMMs to evaluate this optimum model makes use of a forward algorithm and a backward algorithm.

Hybrid approaches have been discussed, where the speech recognition is performed both on a local device, and on a remote server in the cloud. See, e.g., "Hybrid Arbitration using raw ASR string and NLU information," Min Tang, Nuance Communications, Interspeech 2019, Sep. 15-19, 2019, Graz, Austria. Hybrid arbitration is then used to select the best Automatic Speech Recognition (ASR) result from device and cloud outputs. The arbitration process has two steps. Step one is deciding whether to wait for the slower, cloud system. Step two is picking the best result. Step one can involve calculating a confidence measure, which indicates the level of confidence in the device decoding correctly versus the cloud decoding correctly. Current state-of-the-art confidence measures are typically generated using a minimum Bayes risk decoder (MBR) decoder (See Haihua Xu, Daniel Povey, Lidia Mangu, and Jie Zhu, "Minimum Bayes Risk decoding and system combination based on a recursion for edit distance," Comput. Speech Lang., 25(4):802-828, 2011). However, these confidence measures perform poorly for small vocabulary ASR systems.

BRIEF SUMMARY

Techniques disclosed herein relate generally to apparatus and methods for on-device automatic speech recognition (ASR) using a limited command set (small vocabulary)—a command spotter. More specifically, and without limitation, disclosed herein are a method and apparatus for determining a confidence measure to determine where to perform ASR locally on the device, or remotely in the cloud.

In some embodiments, a method for voice command processing for a peripheral device is provided. Digitized audio command is decoded to generate audio features. An in-domain confidence score is calculated, corresponding to the confidence that the plurality of audio features is better decoded by a model trained by a limited set of peripheral device commands. An out-domain confidence score is calculated corresponding to the confidence that the plurality of audio features is better decoded by a model trained by a broader set excluding the peripheral device commands (e.g., a server model). Based on the in-domain and out-domain confidence scores, an audio command is obtained by either (i) processing the audio features with the local processor using a local speech recognition module, or (ii) sending the audio features to a remote server for processing. An action is then performed in the peripheral device in accordance with the audio command.

In some embodiments, a likelihood ratio (LR) is calculated of the in-domain and out-domain confidence scores. Based on the likelihood ratio, a locally decoded audio command is performed, or the audio features are sent to a remote server for processing to determine the audio command. In embodiments, the likelihood ratio is calculated using an Automatic Speech Recognition (ASR) process combining statistical and machine learning models. The statistical model is at least one Hidden Markov Model (HMM) and the machine learning model is at least one Deep Neural Network (DNN). In one embodiment, the audio features sent to a remote server include bottleneck features, d-vectors, Mel Frequency Cepstral Coefficients and phone posterior probabilities.

In one embodiment, the likelihood ratio is not calculated in a decoder, but in a subsequent step—a decoding lattice post-processing. In-domain and out-domain filters are partial Weighted Finite State Transducer (WFST) graphs. They are constructed during a training phase during language model training from in and out domain tokens (training text).

In one embodiment, the in-domain and out-domain models are "partial" Language Models (LMs) quantitatively evaluated using perplexity. The out-domain model is trained on a limited set compared to a server ASR. A phone loop is used that incorporates only all phones in a particular language (e.g., ~40 for English, ~200 for a multilingual embodiment).

In one embodiment, the method further comprises using machine learning to train an in-domain weighted finite state (WFST) graph with in-domain commands, and an out-domain WFST graph with other words. Machine learning is also used to train a language model, which is transformed into a language model decoding graph. Automatic speech recognition (ASR) is performed on the audio features using the language model decoding graph. An output of the ASR and the in-domain and out-domain WFST graphs are then used for calculating the in-domain and out-domain confidence scores.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

BRIEF DESCRIPTION OF THE DRAWINGS

The features of the various embodiments described above, as well as other features and advantages of certain embodiments of the present invention will be more apparent from the following detailed description taken in conjunction with the accompanying drawings, in which.

Throughout the drawings, it should be noted that like reference numbers are typically used to depict the same or similar elements, features, and structures.

DETAILED DESCRIPTION

Figure 1:
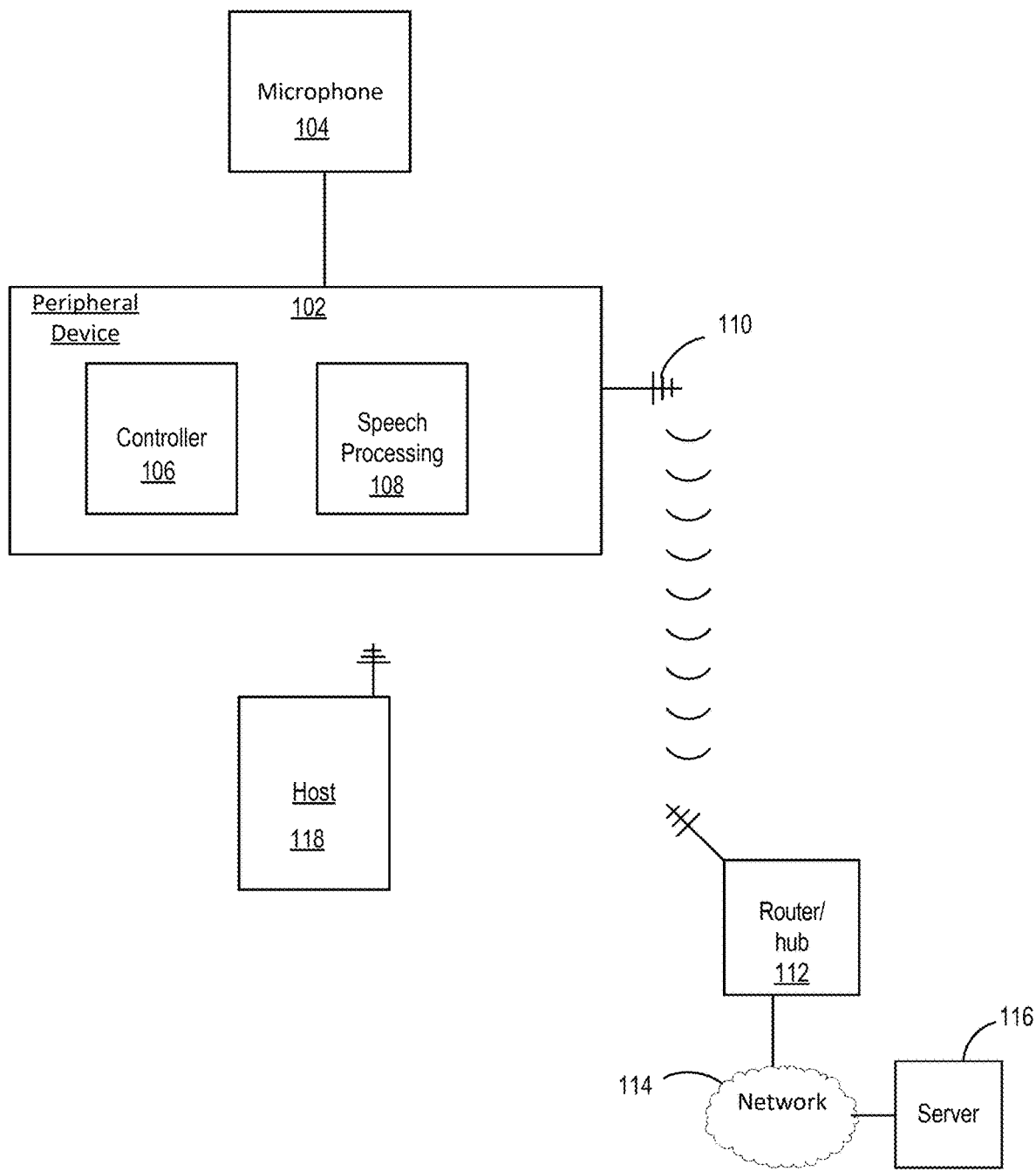
FIG. 1 is a high-level diagram of a device ASR system 100, according to an embodiment.

Aspects of the present disclosure relate generally to electronic devices, and more particularly to computer peripheral devices that utilize speech recognition, according to certain embodiments.

In the following description, various examples of devices utilizing speech recognition are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

The following high-level summary is intended to provide a basic understanding of some of the novel innovations depicted in the figures and presented in the corresponding descriptions provided below. Aspects of the invention relate to a hybrid speech recognition system where a small set of commands are processed locally on a device, while all other commands are processed on a remote server in the cloud. In embodiments, an automatic switch module determines whether a command should be processed locally or sent to the cloud. The switch module determines a confidence measure that the local device can process a particular command, by utilizing a likelihood ratio. The likelihood ratio is the ratio of a confidence score for in-domain (local) versus out-domain (cloud) models of speech recognition.

In embodiments, a model defines the in-domain and out-domain, and is simpler than the computationally intensive approaches used by a cloud ASR. The out-domain training excludes the device commands. "Out-domain processing" is an application of the out-domain model on decoding output. This application acts like filtering. In embodiments, the in-domain and out-domain models are "partial" Language Models (LMs). The LM used in local decoding is a composition of those partial models. Language models in ASR can be quantitatively evaluated using perplexity (perplexity is an evaluation metric for language models). Perplexity can use Extrinsic LM evaluation or Intrinsic LM evaluation. Intrinsic evaluation, used in embodiments herein, involves finding some metric to evaluate the language model itself, not taking into account the specific tasks it's going to be used for. Embodiments of the out-domain model consist of a phone loop that can be understood as a sequence of speech sounds in the spoken query (or every letter in its transcription). Thus, the out-domain model gives a (constant) high probability output. As perplexity is an inverse of probability, this model has low perplexity on any input query. The in-domain model gives a higher probability for in-domain queries (lower perplexity) and a lower probability for out-domain queries (higher perplexity).

In embodiments, the likelihood ratio is calculated not in a decoder, where prior art typically calculates confidence scores, but in a subsequent step, a decoding lattice post-processing. In one embodiment, the likelihood ratio is calculated using an Automatic Speech Recognition (ASR) system which is a mixture of statistical (HMIs) and machine learning (Deep Neural Networks—DNNs) models.

It is to be understood that this high-level summary is presented to provide the reader with a baseline understanding of some of the novel aspects of the present disclosure and a roadmap to the details that follow. This high-level summary in no way limits the scope of the various embodiments described throughout the detailed description and each of the figures referenced above are further described below in greater detail and in their proper scope.

FIG. 1 is a high-level diagram of a speech processing system according to an embodiment of the present invention. A microphone 104 provides an audio input to a peripheral device 102. Device 102 includes a controller 106, a speech processing module 108 and a transmission antenna 110. Decoded audio features can either be processed locally, or can be transmitted to the cloud, such as through a router or hub 112, a network (Internet) 114 to a server 116. Audio features are elements of the audio, in some embodiments other than the words or phones themselves, such as bottleneck features, d-vectors, and phone posterior probabilities, described in more detail below. In an alternate embodiment, some or all of the functions of speech processing module 108 and controller 106 could be performed on a local host computer 118, with results provided back to device 102.

Peripheral device 102 can be any local device, such as a speaker, a video conference controller system, media player, home security system, smart home lighting and temperature monitoring system, alarm clock, weather station or any other consumer electronic device that could be controlled using vocal commands. The following are example commands for a video conferencing system:
Start the meeting;
Start my meeting;
Call <person's name>;
Start <meeting ID>;
Start meeting with <person's name>;
Share screen;
Share my screen;
Mute;
Turn off audio;
Stop the video; and
Stop the camera.

In some embodiments, a method for voice command processing for a peripheral device is provided. A wake word is detected in digitized audio, and an associated audio command is decoded to generate audio features (before or during step 607 in FIG. 6). Alternately, a wake button or other action can substitute for a wake word. An in-domain confidence score (610) is calculated, corresponding to the confidence that the plurality of audio features is better decoded by a model trained by a limited set of peripheral device commands. An out-domain confidence score (611) is calculated corresponding to the confidence that the plurality of audio features is better decoded by a model trained by a broader set not limited to the limited set of peripheral device commands. A likelihood ratio (LR) is calculated (612) of the in-domain and out-domain confidence scores. Based on the likelihood ratio, the audio features are either processed in the device with a speech recognition module to determine an audio command, or are sent to a remote server for processing to determine the audio command. An action is then performed in the peripheral device 418 in accordance with the audio command.

The below describes a system which can provide the controller in the peripheral device, or the host computer. That is followed by a description of embodiments of the hybrid speech processing system of the present invention.

A System for Operating a Computer Peripheral Device

Figure 2:
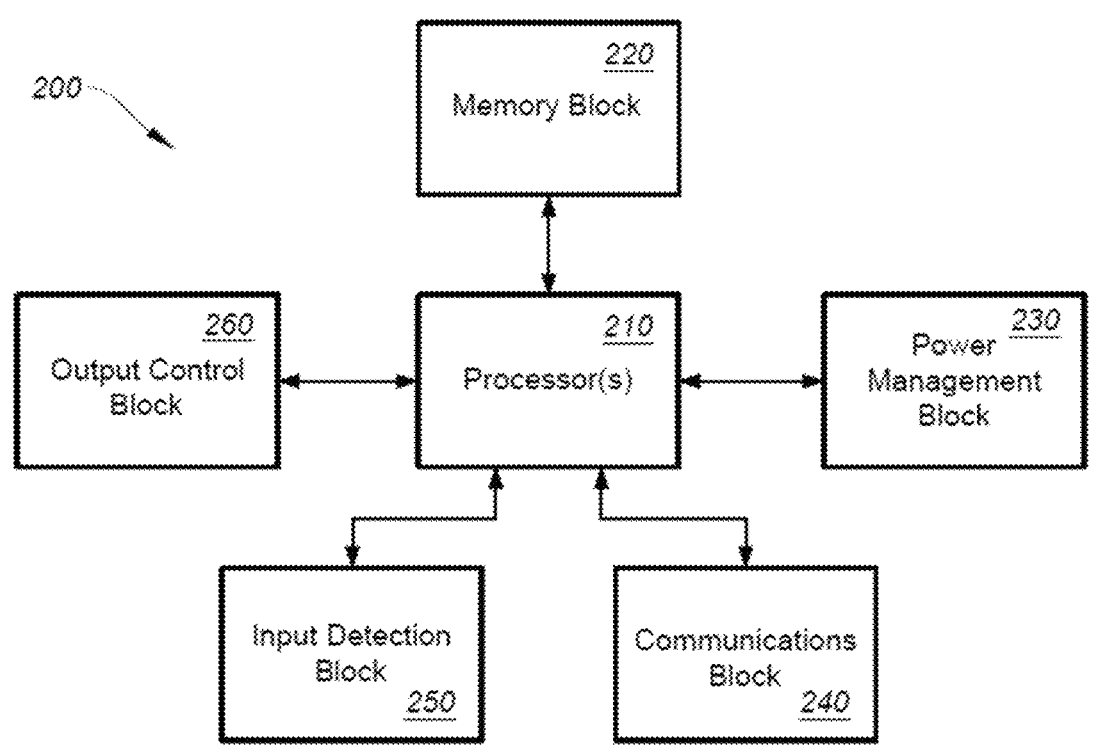
FIG. 2 shows a system 200 for operating the peripheral device of FIG. 1, according to certain embodiments.

FIG. 2 shows a system 200 for operating the peripheral device of FIG. 1, according to certain embodiments. System 200 may be configured to operate any of the computer peripheral devices specifically shown or not shown herein but within the wide purview of the present disclosure. System 200 may include processor(s) 210, memory 220, a power management system 230, a communication module 240, an input detection module 250, and an output control module 260. Each of the system blocks 220-260 can be in electronic communication with processor(s) 210 (e.g., via a bus system). System 200 may include additional functional blocks that are not shown or discussed to prevent obfuscation of the novel features described herein. System blocks 220-260 (also referred to as "modules") may be implemented as separate modules, or alternatively, more than one system block may be implemented in a single module. In the context described herein, system 200 can be incorporated into any input device described herein and may be configured to perform any of the various methods of automatic speech recognition, as described below at least with respect to FIGS. 4-9B, as would be appreciated by one of ordinary skill in the art with the benefit of this disclosure.

In certain embodiments, processor(s) 210 may include one or more microprocessors and can be configured to control the operation of system 200. Alternatively or additionally, processor(s) 210 may include one or more microcontrollers (MCUs), digital signal processors (DSPs), or the like, with supporting hardware and/or firmware (e.g., memory, programmable I/Os, etc.), and/or software, as would be appreciated by one of ordinary skill in the art. Processor(s) 210 can control some or all aspects of the operation of computer peripheral device 150 (e.g., system block 220-260). Alternatively or additionally, some of system blocks 220-260 may include an additional dedicated processor, which may work in conjunction with processor(s) 210. For instance, MCUs, μCs, DSPs, and the like, may be configured in other system blocks of system 200. Communications block 240 may include a local processor, for instance, to control aspects of communication with host computer 110 (e.g., via Bluetooth, Bluetooth LE, RF, IR, hardwire, ZigBee, Z-Wave, Logitech Unifying, or other communication protocol). Processor(s) 210 may be local to the peripheral device (e.g., contained therein), may be external to the peripheral device (e.g., off-board processing, such as by a corresponding host computing device), or a combination thereof. Processor(s) 210 may perform any of the various functions and methods (e.g., methods 600) described and/or covered by this disclosure in conjunction with any other system blocks in system 200. In some implementations, processor 302 of FIG. 3 may work in conjunction with processor 210 to perform some or all of the various methods described throughout this disclosure. In some embodiments, multiple processors may enable increased performance characteristics in system 200 (e.g., speed and bandwidth), however multiple processors are not required, nor necessarily germane to the novelty of the embodiments described herein. One of ordinary skill in the art would understand the many variations, modifications, and alternative embodiments that are possible.

Memory block ("memory") 220 can store one or more software programs to be executed by processors (e.g., in processor(s) 210). It should be understood that "software"

can refer to sequences of instructions that, when executed by processing unit(s) (e.g., processors, processing devices, etc.), cause system 200 to perform certain operations of software programs. The instructions can be stored as firmware residing in read-only memory (ROM) and/or applications stored in media storage that can be read into memory for execution by processing devices (e.g., processor(s) 210). Software can be implemented as a single program or a collection of separate programs and can be stored in non-volatile storage and copied in whole or in-part to volatile working memory during program execution. In some embodiments, memory 220 may store data corresponding to inputs on the peripheral device, such as a detected movement of the peripheral device a sensor (e.g., optical sensor, accelerometer, etc.), activation of one or more input elements (e.g., buttons, sliders, touch-sensitive regions, etc.), or the like. Stored data may be aggregated and send via reports to a host computing device.

In certain embodiments, memory array ("memory") 220 can store the various data described throughout this disclosure. For example, memory 220 can store and/or include the ASR program, WFST graphs and decoding lattice described in FIG. 6. Memory 220 can be used to store any suitable data to perform any function described herein and as would be appreciated by one of ordinary skill in the art with the benefit of this disclosure. Memory array 220 can be referred to as a storage system or storage subsystem, and can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute in order to execute various operations (e.g., software-controlled spring auto-adjustment, etc.) as described herein.

Power management system 230 can be configured to manage power distribution, recharging, power efficiency, haptic motor power control, and the like. In some embodiments, power management system 230 can include a battery (not shown), a Universal Serial Bus (USB)-based recharging system for the battery (not shown), and power management devices (e.g., voltage regulators—not shown), and a power grid within system 200 to provide power to each subsystem (e.g., communications block 240, etc.). In certain embodiments, the functions provided by power management system 230 may be incorporated into processor(s) 210. Alternatively, some embodiments may not include a dedicated power management block. For example, functional aspects of power management block 240 may be subsumed by another block (e.g., processor(s) 210) or in combination therewith. The power source can be a replaceable battery, a rechargeable energy storage device (e.g., super capacitor, Lithium Polymer Battery, NIMH NiCd), or a corded power supply. The recharging system can be an additional cable (specific for the recharging purpose) or it can use a USB connection to recharge the battery.

Communication system 240 can be configured to enable wireless communication with a corresponding host computing device (e.g., 110), or other devices and/or peripherals, according to certain embodiments. Communication system 240 can be configured to provide radio-frequency (RF), Bluetooth®, Logitech proprietary communication protocol (e.g., Unifying, Gaming Light Speed, or others), infra-red (IR), ZigBee®, Z-Wave, or other suitable communication technology to communicate with other computing devices and/or peripheral devices. System 200 may optionally comprise a hardwired connection to the corresponding host computing device. For example, computer peripheral device 130 can be configured to receive a USB, FireWire®, Thunderbolt®, or other universal-type cable to enable bi-directional electronic communication with the corresponding host computing device or other external devices. Some embodiments may utilize different types of cables or connection protocol standards to establish hardwired communication with other entities. In some aspects, communication ports (e.g., USB), power ports, etc., may be considered as part of other blocks described herein (e.g., input detection module 250, output control modules 260, etc.). In some aspects, communication system 240 can send reports generated by the processor(s) 210 (e.g., HID data, streaming or aggregated data, etc.) to a host computing device. In some cases, the reports can be generated by the processor(s) only, in conjunction with the processor(s), or other entity in system 200. Communication system 240 may incorporate one or more antennas, oscillators, etc., and may operate at any suitable frequency band (e.g., 2.4 GHz), etc. One of ordinary skill in the art with the benefit of this disclosure would appreciate the many modifications, variations, and alternative embodiments thereof.

Input detection module 250 can control the detection of a user-interaction with input elements (also referred to as "elements") on an input device. For instance, input detection module 250 can detect user inputs from motion sensors, keys, buttons, roller wheels, scroll wheels, track balls, touch pads (e.g., one and/or two-dimensional touch sensitive touch pads), click wheels, dials, keypads, microphones, GUIs, touch-sensitive GUIs, proximity sensors (e.g., infra-red, thermal, etc.), image sensor based detection such as gesture detection (e.g., via webcam), audio based detection such as voice input (e.g., via microphone), or the like, as would be appreciated by one of ordinary skill in the art with the benefit of this disclosure. Alternatively, the functions of input detection module 250 can be subsumed by processor 210, or in combination therewith.

In some embodiments, output control module 260 can control various outputs for a corresponding computer peripheral device. For instance, output control module 260 may control a number of visual output elements (e.g., LEDs, LCD screens), displays, audio outputs (e.g., speakers), haptic output systems, or the like. One of ordinary skill in the art with the benefit of this disclosure would appreciate the many modifications, variations, and alternative embodiments thereof.

Although certain systems may not be expressly discussed, they should be considered as part of system 200, as would be understood by one of ordinary skill in the art. For example, system 200 may include a bus system to transfer power and/or data to and from the different systems therein. It should be appreciated that system 200 is illustrative and that variations and modifications are possible. System 200 can have other capabilities not specifically described herein. Further, while system 200 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained.

Embodiments of the present invention can be realized in a variety of apparatuses including electronic devices (e.g., computer peripheral devices) implemented using any combination of circuitry and software. Furthermore, aspects and/or portions of system 200 may be combined with or operated by other sub-systems as required by design. For example, input detection module 250 and/or memory 220 may operate within processor(s) 210 instead of functioning as a separate entity. In addition, the inventive concepts described herein can also be applied to any electronic device. Further, system 200 can be applied to any of the computer peripheral devices described in the embodiments herein, whether explicitly, referentially, or tacitly described (e.g., would have been known to be applicable to a particular computer peripheral device by one of ordinary skill in the art). The foregoing embodiments are not intended to be limiting and those of ordinary skill in the art with the benefit of this disclosure would appreciate the myriad applications and possibilities.

System for Operating a Host Computing Device

Figure 3:
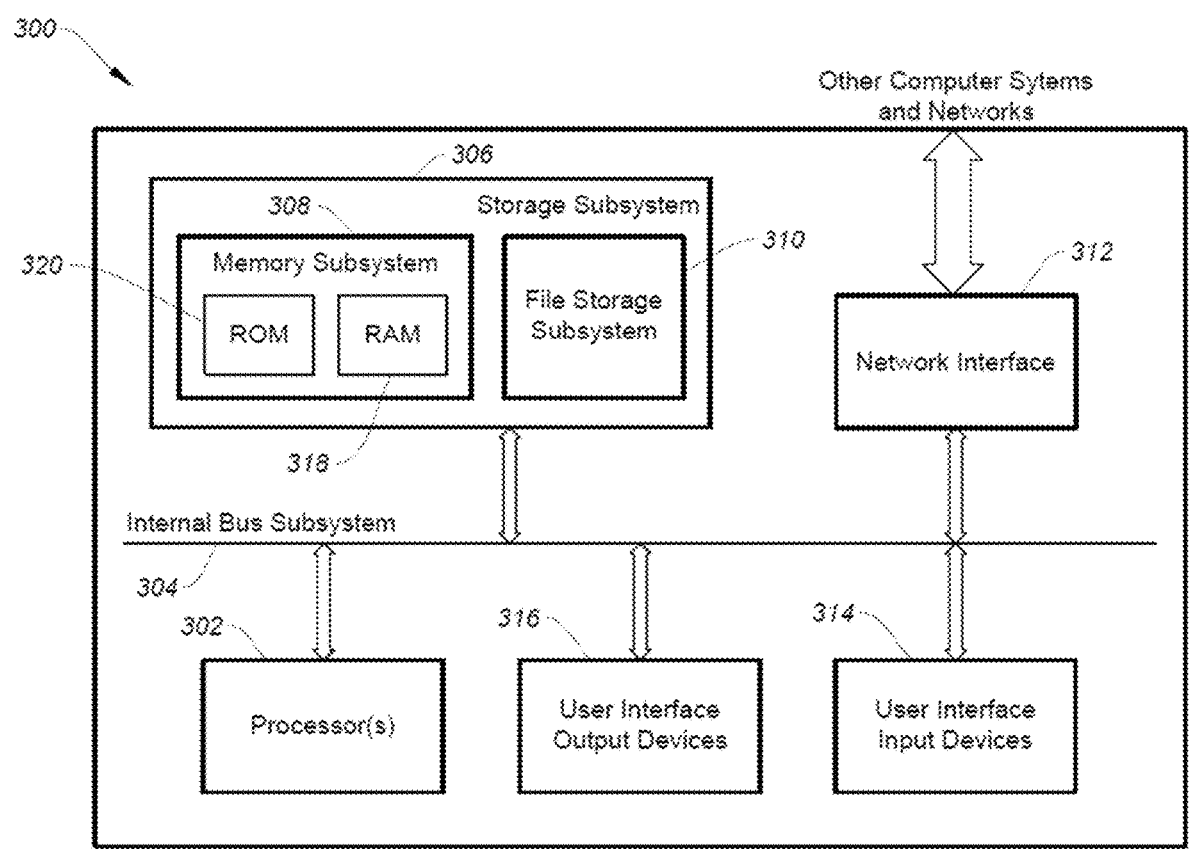
FIG. 3 shows is a simplified block diagram of a host computing device 300, according to certain embodiments.

FIG. 3 is a simplified block diagram of a host computing device 300, according to certain embodiments. Host computing device 300 can implement some or all functions, behaviors, and/or capabilities described above that would use electronic storage or processing, as well as other functions, behaviors, or capabilities not expressly described. Host computing device 300 can include a processing subsystem (processor(s)) 302, a storage subsystem 306, user interfaces 314, 316, and a communication interface 312. Computing device 300 can also include other components (not explicitly shown) such as a battery, power controllers, and other components operable to provide various enhanced capabilities. In various embodiments, host computing device 300 can be implemented in any suitable computing device, such as a desktop or laptop computer (e.g., desktop 110), mobile device (e.g., tablet computer, smart phone, mobile phone), wearable device, media device, or the like, or in peripheral devices (e.g., keyboards, etc.) in certain implementations.

Processor(s) 302 can include MCU(s), micro-processors, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of methods, functions, etc., described throughout this disclosure.

Storage subsystem 306 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include a memory subsystem 308 including random access memory (RAM) 318 such as dynamic RAM (DRAM), static RAM (SRAM), synchronous dynamic RAM (e.g., DDR), or battery backed up RAM or read-only memory (ROM) 320, or a file storage subsystem 310 that may include one or more code modules. In some embodiments, storage subsystem 306 can store one or more applications and/or operating system programs to be executed by processing subsystem 302, including programs to implement some or all operations described above that would be performed using a computer. For example, storage subsystem 306 can store one or more code modules for implementing one or more method steps described herein.

A firmware and/or software implementation may be implemented with modules (e.g., procedures, functions, and so on). A machine-readable medium tangibly embodying instructions may be used in implementing methodologies described herein. Code modules (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine readable medium such as a storage medium. A code segment (e.g., code module) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc. These descriptions of software, firmware, storage mediums, etc., apply to systems 200 and 300, as well as any other implementations within the wide purview of the present disclosure. In some embodiments, aspects of the invention (e.g., surface classification) may be performed by software stored in storage subsystem 306, stored in memory 220 of a computer peripheral device, or both. One of ordinary skill in the art with the benefit of this disclosure would appreciate the many modifications, variations, and alternative embodiments thereof.

Implementation of the techniques, blocks, steps and means described throughout the present disclosure may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module may comprise sets of instructions (codes) embodied on a computer-readable medium that directs a processor of a host computing device 110 to perform corresponding actions. The instructions may be configured to run in sequential order, in parallel (such as under different processing threads), or in a combination thereof. After loading a code module on a general purpose computer system, the general purpose computer is transformed into a special purpose computer system.

Computer programs incorporating various features described herein (e.g., in one or more code modules) may be encoded and stored on various computer readable storage media. Computer readable media encoded with the program code may be packaged with a compatible electronic device, or the program code may be provided separately from electronic devices (e.g., via Internet download or as a separately packaged computer readable storage medium). Storage subsystem 306 can also store information useful for establishing network connections using the communication interface 312.

Computer system 300 may include user interface input devices 314 elements (e.g., touch pad, touch screen, scroll wheel, click wheel, dial, button, switch, keypad, microphone, etc.), as well as user interface output devices 316 (e.g., video screen, indicator lights, speakers, headphone jacks, virtual- or augmented-reality display, etc.), together with supporting electronics (e.g., digital to analog or analog to digital converters, signal processors, etc.). A user can operate input devices of user interface 314 to invoke the functionality of computing device 300 and can view and/or hear output from computing device 300 via output devices of user interface 316.

Processing subsystem 302 can be implemented as one or more processors (e.g., integrated circuits, one or more single core or multi core microprocessors, microcontrollers, central processing unit, graphics processing unit, etc.). In operation, processing subsystem 302 can control the operation of computing device 300. In some embodiments, processing subsystem 302 can execute a variety of programs in response to program code and can maintain multiple concurrently executing programs or processes. At a given time, some or all of a program code to be executed can reside in processing subsystem 302 and/or in storage media, such as storage subsystem 304. Through programming, processing subsystem 302 can provide various functionality for computing device 300. Processing subsystem 302 can also execute other programs to control other functions of computing device 300, including programs that may be stored in storage subsystem 304.

Communication interface (also referred to as network interface) 312 can provide voice and/or data communication capability for computing device 300. In some embodiments, communication interface 312 can include radio frequency (RF) transceiver components for accessing wireless data networks (e.g., Wi-Fi network; 3G, 4G/LTE; etc.), mobile communication technologies, components for short range wireless communication (e.g., using Bluetooth communication standards, NFC, etc.), other components, or combinations of technologies. In some embodiments, communication interface 312 can provide wired connectivity (e.g., universal serial bus (USB), Ethernet, universal asynchronous receiver/transmitter, etc.) in addition to, or in lieu of, a wireless interface. Communication interface 312 can be implemented using a combination of hardware (e.g., driver circuits, antennas, modulators/demodulators, encoders/decoders, and other analog and/or digital signal processing circuits) and software components. In some embodiments, communication interface 312 can support multiple communication channels concurrently.

User interface input devices 314 may include any suitable computer peripheral device (e.g., computer mouse, keyboard, gaming controller, remote control, stylus device, etc.), as would be appreciated by one of ordinary skill in the art with the benefit of this disclosure. User interface output devices 316 can include display devices (e.g., a monitor, television, projection device, etc.), audio devices (e.g., speakers, microphones), haptic devices, etc. Note that user interface input and output devices are shown to be a part of system 300 as an integrated system. In some cases, such as in laptop computers, this may be the case as keyboards and input elements as well as a display and output elements are integrated on the same host computing device. In some cases, the input and output devices may be separate from system 300, as shown in FIG. 1. One of ordinary skill in the art with the benefit of this disclosure would appreciate the many modifications, variations, and alternative embodiments thereof.

It will be appreciated that computing device 300 is illustrative and that variations and modifications are possible. A host computing device can have various functionality not specifically described (e.g., voice communication via cellular telephone networks) and can include components appropriate to such functionality. While the computing device 300 is described with reference to particular blocks, it is to be understood that these blocks are defined for convenience of description and are not intended to imply a particular physical arrangement of component parts. For example, processing subsystem 302, storage subsystem 306, user interfaces 314, 316, and communications interface 312 can be in one device or distributed among multiple devices. Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Host computing devices or even peripheral devices described herein can be implemented using system 300.

Some embodiments may utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. F or example, customized hardware might also be used and/or particular elements might be implemented in hardware, software (including portable software, such as applets) or both. Further, connections to other computing devices such as network input/output devices may be employed.

Hybrid Voice System

Embodiments provide a hybrid method for speech recognition in a local device. The speech processing is divided into at least two parts: (1) a local system that runs on the device and (2) a cloud backend computer or server that is accessible over a network interface. Both the local device and the cloud backend systems include machine learning (ML) based speech processing capabilities. however, the local system may have a comparatively limited speech processing capability compared to speech processing capability of the cloud backend system, which may be subject to the hardware and other computational limitations. These limited speech processing capabilities, compared to the cloud backend system, could include, e.g., smaller vocabulary, simple grammar, no contextual information, and the like. In comparison, the cloud backend may have larger processing power and benefits from a large vocabulary, is able to process complex natural language commands and has access to the databases that hold contextual information.

The local system processes simpler commands locally. The cloud system is used as a fallback mechanism, for example, in case that the local system is unable to process a given voice command on its own. An automatic "switch module" decides where, on the device or in the cloud, a query should be processed. A major hurdle to realizing such a system is that in most machine learning systems, detecting that the local device is unable to process a given query is very hard. There are a number of theoretical reasons for this problem, namely, many machine learning problems are not robust to "out of distribution" inputs. For example, in a speech processing system, words that are outside the vocabulary of the system might be interpreted as completely unrelated words or combination of words.

Moreover, while many machine learning systems can provide some form of confidence when providing inference for a given input, quite often when facing an out of domain input they continue to produce an output with very high confidence even though the results are completely wrong. Thus a challenge addressed in this invention is to provide a controller that can examine specific metrics extracted during the processing of the speech commands, and can reliably assess whether the input command should be relayed to the cloud backend or the outcome of the local processing should be used directly.

Figure 4:
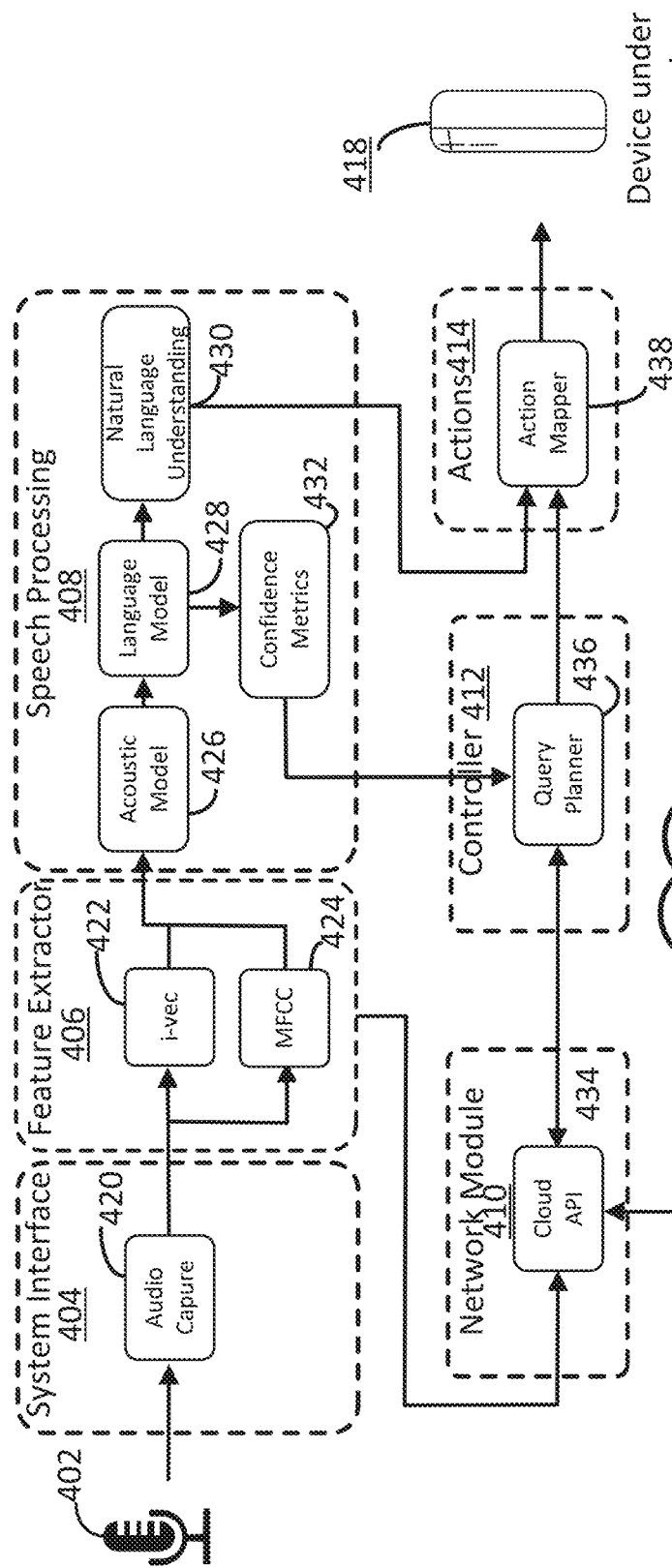
FIG. 4 is a diagram of a speech processing system according to an embodiment.

FIG. 4 is a diagram of a speech processing system according to an embodiment. The high level architecture of the proposed system is shown in FIG. 1. A microphone 402 provides an analog audio signal to a system interface 404, which provides a digitized audio signal to a feature extractor 406. The extracted features are provided to a speech processing module 408, and are also provided to a network module 410, so the features can be provided to a remote server in a cloud Automatic Speech Recognition (ASR) system 416 if necessary. A controller 412 determines whether the speech can be processed locally, or should be sent to the cloud, based on a likelihood ratio of confidence metrics. After the speech is processed, the command in the speech is provided to an actions module 414 to control a device under control 418.

FIG. 4 shows an audio capture module 420 in system interface 420. Audio capture module 420 performs analog to digital conversion of the audio from microphone 402, and may perform pre-processing of the audio to clean up the signal. For example, the pre-processing may include one or more of data compression or normalization, beamforming (in the case of multiple microphone inputs), automatic echo cancellation, resampling, filtering, equalization and automatic gain control (AGC).

Feature extractor module 406 includes i-vector module 422 and MFCC module 424. I-vector module 406 performs i-vector extraction (or d-vector x-vector or other speaker dependent features). In an i-vector model, utterance statistics are extracted from features using a universal background model. The utterance is mapped to a vector in the total variability space, which is called an i-vector. MFCC module 424 is a module for extracting multiple features, using an extraction method called Mel-frequency cepstral coefficients (MFCC). Mel Frequency Cepstral Coefficients are shown, but other features are possible, such as spectrograms or frequency-warped filter banks, all of which capture speaker independent features (related to semantics—e.g., what has been spoken). The MFCC may have many features, in one embodiment up to 39 features are used, which include 13 MFCCs, and additional 13 delta features, and 13 delta-delta features. However, the 39 is just one example, and the system can use less or more. The extracted features and i-vector are provided to a speech processing module 408, and are also provided to a network module 410. Both feature extractor 406 and speech processing module 408 are part of decoder 514 of FIG. 5 and ASR 607 of FIG. 6.

Speech processing module 408 includes an acoustic model 426, which models the spoken sounds. Language model 428 models the written letters, words and sentences or phrases. Natural language model 430 processes natural language commands. Each of these modules is trained using statistical or machine learning methods. A confidence metrics module 432 calculates confidence scores which indicate a degree of confidence in a correct recognition of a command. One confidence score is for in-domain confidence that it is one of a limited number of device commands. Another confidence score is for an out-domain confidence that it is something else, or contains more than a device command. Specific metrics are selected to allow detecting whether the local speech processing part cannot reliably process the detected audio. Example metrics include Equal Error Rate, or fixing FPR/FNR—false positive/negative rates—at a certain rate. ROC (Receiver Operating Characteristic) and PR (Precision-Recall) curves produced from evaluation data can also be used.

Controller 412 includes a query planner 436. Controller 412 uses a model to make a decision on whether to do the speech processing locally, or in the cloud, based on the confidence metrics. In some embodiments a likelihood ratio of the in-domain and out-domain confidence scores is calculated. In some embodiments, in addition to the likelihood ratio, other factors may be used as well. Some examples of other factors include the length of audio and the availability of the network or other resources to either to accept the local processing results or to forward the query to the cloud. The query planner 436 uses the calculated likelihood ratio (LR) to decide whether to keep the query or to forward it to the cloud. In one embodiment, the query planner only uses the LR together with an acceptance threshold to make the decision whether to send to the cloud. In another embodiment, the query planner uses other metrics as well, such as the length of the voice query (in number of samples or in time), number of phonemes, presence of specific keywords, and the like, together with a machine learning based model to make the keep/forward decision. The machine learning based model could be as simple as a linear regression model or even small neural network.

In one embodiment, the audio features sent to a remote server include bottleneck features, d-vectors, and phone posterior probabilities. Bottleneck features are a set of activations of nodes over time from a bottleneck layer in a trained deep neural network (DNN). The bottleneck layer is a hidden layer in the DNN of reduced dimension relative to the other layers (e.g., 3 nodes compared to 20). This DNN can be trained to discriminate between different output classes such as senones, speakers, conditions, etc. Using a bottleneck layer in the DNN ensures that all information required to ultimately determine the posteriors at the DNN's output layer is restrained to a small number of nodes. (See Ferrer, et al., "Exploring the Role of Phonetic Bottleneck Features for Speaker and Language Recognition", 2016 IEEE International Conference on Acoustics, Speech and Signal Processing (ICASSP), 5575-5579.)

The d-vector feature is a kind of feature extracted through a deep neural network (DNN), specifically being an output of a last hidden layer of DNN. As noted earlier, the vector features are used for speaker identification/verification. Thus, the DNN that produces d or x-vectors (different variants of DNNs) are speaker classification DNNs. I-vectors are a statistical approach (an older approach, developed before d and x vectors). A phone posterior represents a posterior likelihood probability of a spoken phone. Each time frame, e.g., 10 ms for example, an acoustic model estimates those probabilities for all phones or senones, with those probabilities summing up to 1. Ending boundaries can be detected later by a process called "forced alignment." This is a by-product of ASR decoding.

In one embodiment, the likelihood ratio is not calculated in a decoder, but in a subsequent step—a decoding lattice post-processing. In-domain and out-domain filters are partial Weighted Finite State Transducer (WFST) graphs. They are constructed during a training phase during language model training from in and out domain tokens (training text). WFSTs are used for modeling HMMs and solving state machine problems.

In one embodiment, the local and cloud speech processing systems use the same audio features for their machine learning (ML) models. As such, this method forwards only the processed audio in the form of audio features, rather than the raw audio to the cloud system. This approach provides multiple benefits. One benefit is a reduction in the costs of the backend. A large number of voice queries are simple interactions that can be handled locally. By processing them in the device rather than sending everything to the cloud backend, significant cost savings could be achieved. Another benefit is a reduction in the delay. Passing data and messages over the network introduces latency. By processing queries locally, instead of sending them to the cloud, for many basic interactions (such as "volume up", "pause", etc.) the overall responsiveness of the system is improved. Another benefit is improving availability. By processing all the basic voice queries locally, a minimum level of service independent of any network communication status problems can be guaranteed. This is especially important for mobile devices which are typically connected to the network using wireless technologies.

Additionally, this approach ensures privacy. Compared to a more traditional, cloud based solutions, the privacy of the end users is protected due to two provisions in the hybrid system. (1) Only specific audio queries, not every audio activating the system, will be transferred to the cloud. (2) Instead of transmitting raw audio data, a more compact representation of audio (audio features) is sent to the cloud. These representations are typically one-way functions that would make recovering the original audio signals very hard or impossible. In addition, the communication bandwidth is reduced. Two factors contribute to the reduction in the amount data transferred to the backend: (1) local processing of simpler queries 2) transmission of audio features that are naturally a more compact representation of raw audio data.

In some implementations, the audio capture system interface (404) is a separate chip/device (e.g. an audio codec IC). The rest of the system is integrated inside the same processor/micro-controller. This processor/micro-controller could be the main and only application processor in the device. To improve the performance, in one embodiment the main processor has an internal DSP or ML accelerator component. Alternately, the processor communicates with an external DSP or ML component.

Various other embodiments could be used. For example, an all in one chip design is an alternate embodiment. An audio-codec (404) as well as the ASR and hybrid machinery as well as the actions and other functionality of the system are all performed in a single processor/micro-controller.

In yet another example embodiment, two processors are used for the device. A separate audio codec is used with a separate processor for the voice processing (comprising modules 406, 408, 412 and 414). A separate application processor is used for the rest of the device operations, and optionally can also include the network interface module (410).

In another embodiment, the peripheral device is used with a local personal computer (PC). This is mainly a software solution where the voice processing modules are installed as a software package on a PC running a multi-tasking operating system such as Linux or Windows. The microphone can be on the peripheral device, and send the raw audio to the PC. Alternately, a microphone of the PC is used. After the command is decoded, it is transmitted to the peripheral device from the PC.

Figure 5:
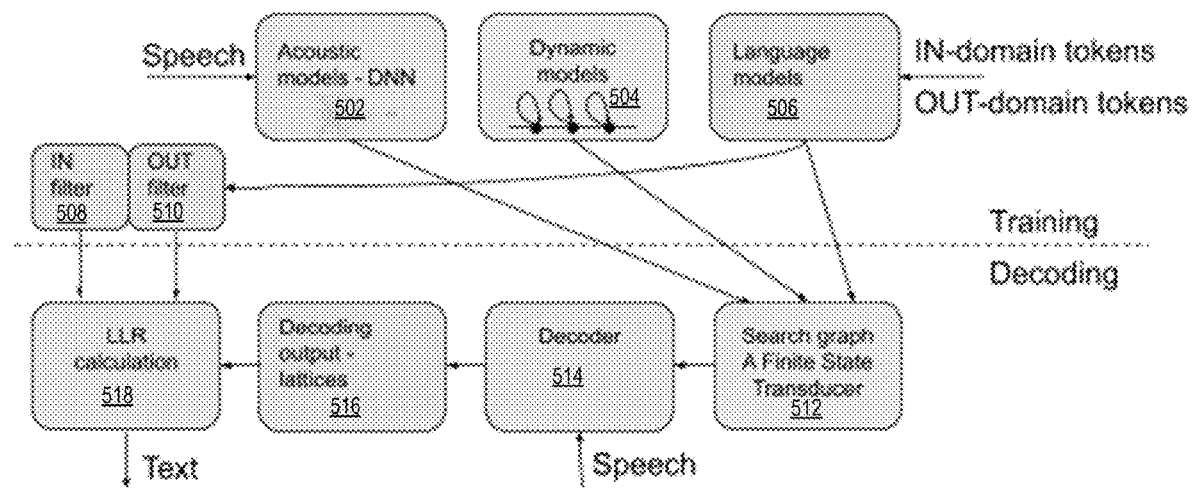
FIG. 5 is a diagram of the likelihood ratio (LR) calculation in an Automatic Speech Recognition (ASR) system, according to an embodiment.

FIG. 5 is a diagram of the likelihood ratio (LR) calculation in an Automatic Speech Recognition (ASR) system. A mixture of statistical (HMMs) and machine learning (Deep Neural Networks—DNNs) models are used. The dynamic models usually work with 3 HMM states per phoneme, although new architectures propose a single HMM state per phoneme (See, e.g., the Kaldi chain model, 2015: http://kaldi-asr.org/doc/chain.html). The Kaldi chain model is a type of DNN-HMM model, implemented using nnet3.

The training modules are indicated above the dotted line in FIG. 5. An acoustic model 502, using DNN is provided, along with dynamic models 504 and language models 506. In and Out filters 508, 510 model the In and Out domains. A Finite State Transducer (FST) search graph 512 is built using models 502, 504 and 506. FST search graph 512 is used by Decoder 514 to decode input speech, and the output is provided as Decoding output lattices 516. The lattices represent the most probable word sequence(s). The decoding lattices, together with the filters 508 and 509, are processed at 518 to calculate a Likelihood Ratio (LR or LLR). The in-domain and out-domain tokens are the training text. For the in-domain, the tokens are a set of in-domain commands, like volume-up, volume-down.

Figure 6:
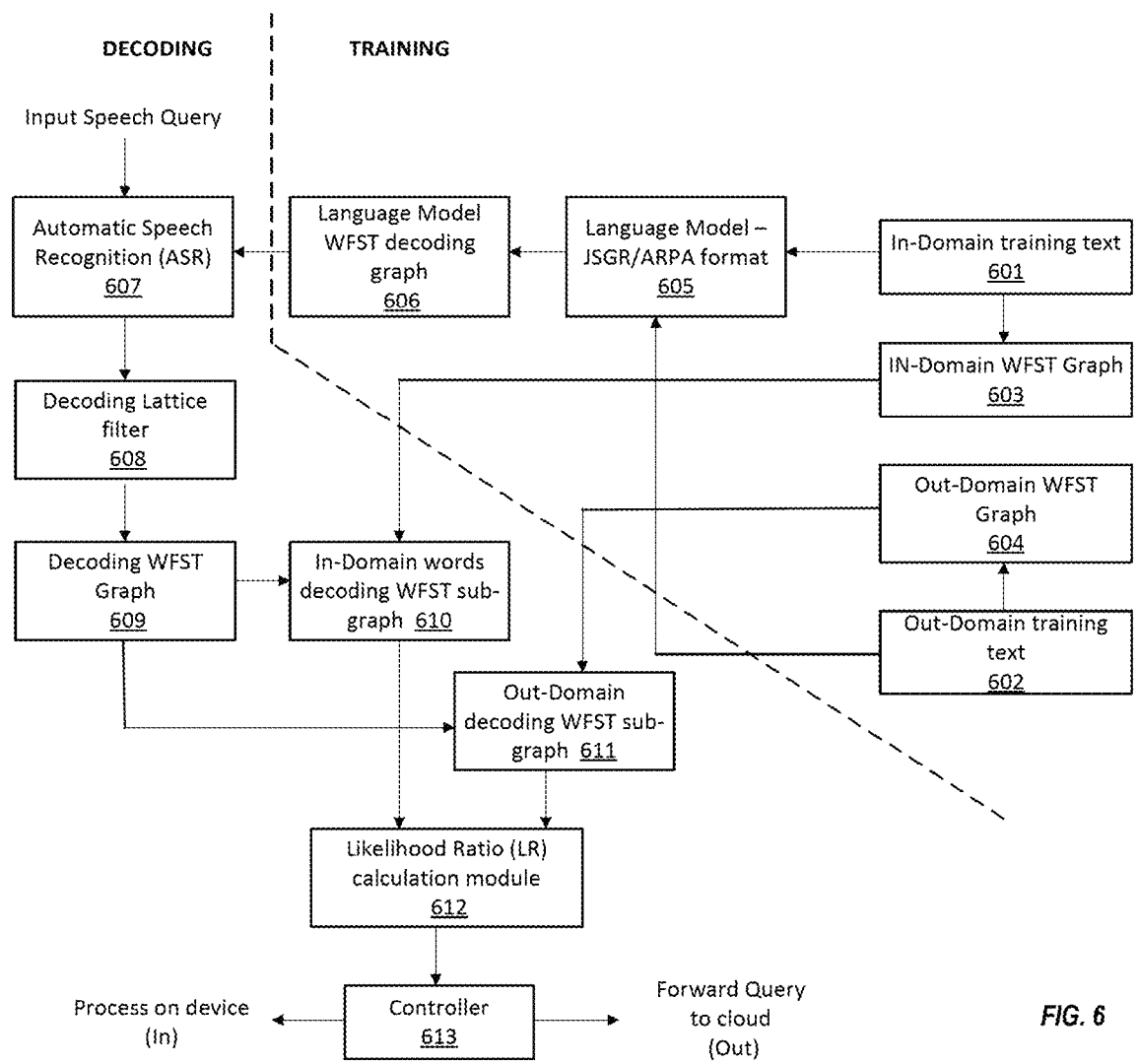
FIG. 6 is a flow chart of the machine learning training and operation steps to determine whether device or cloud speech processing should be used, according to embodiments.

FIG. 6 is a flow chart of the system of FIG. 5, showing more detail on the machine learning training and operation steps to determine whether device or cloud speech processing should be used, according to embodiments. The controller processing consists of the training (steps 601-606) and inference phases (steps 607-613). All the steps are performed on the device. The training phase is done offline before using the controller. The inference (decoding) phase processes an input speech query and assigns confidence either that the query contains in-domain commands and should be directly executed on the device, or that the query is out-of-domain and should be further processed on the cloud. The confidence calculator is based on a likelihood ratio method.

The training phase begins with in-domain text data preparation (601). This is, for example, a set of in-domain commands, like volume-up, volume-down. The out-of-domain text (602) represents all other words a user can speak, represented, for example, as a phone sequence. From (601), an "in" graph that represents all permissible in-domain words is constructed (603), and similarly, from (602), an "out" graph represented as all phones (so-called phone loop) is built (604). Both (603) and (604) are Weighted Finite State Graphs (WFST). A Language Model (LM) is constructed from both input text data (605), whether as a grammar (a JSGF format) or n-gram (an ARPA format). The LM is then transformed into a decoding graph (606). An acoustic model is required for Automatic Speech Recognition (ASR), but its training is independent of the described system (in other words, any acoustic model can be used).

The JSpeech Grammar Format (JSGF) is a platform-independent, vendor-independent textual representation of grammars for use in speech recognition. In particular, it is a way of describing one type of grammar, a rule grammar (also known as a command and control grammar or regular grammar). It uses a textual representation that is readable and editable by both developers and computers, and can be included in source code.

ARPA language models are essentially "everything is possible" kind of models of the language. Given any sequence of N or less than N words, they provide a probability of that sequence being seen in a sufficiently large representative sample of that language.

The inference phase starts by running ASR module 607 on an input speech query using the pre-trained decoding graph 606. The decoding output, a lattice 608, represents the most probable output word sequences. The lattice is then transformed into a decoding WFST graph 609 containing the same word sequences, with each word associated probabilities. The role of the controller is to assign confidence if the input speech query contains in-domain word sequences, and this process starts by a Finite State Transducer (FST) composition of the decoding graph 609 and "in" pre-trained graph 603, which results in a decoding sub-graph composed only of in-domain words, subgraph 610. Similarly, FST composition of decoding graph 609 and "out" pre-trained graph 604 results in a decoding sub-graph 611 composed only of phone loop sequences.

An FST is a finite state automaton (FSA, FA) which produces an output as well as reading input, which means it is useful for parsing. An FST has a finite number of states which are linked by transitions labeled with an input/output pair. The FST starts out in a designated start state and jumps to different states depending on the input, while producing an output according to its transition table.

The likelihood ratio calculation (612) takes the two decoding sub-graphs (610) and (611) and finds the shortest paths. The shortest paths have assigned log probabilities, L_in for in-domain and L_out for out-domain. The composition operations that output (610) and (611) might result in empty graphs. For example, if no in-domain command was spoken, the (610) will be empty. In this case, the shortest path in (610) is not calculated, and a constant value is assigned; for example, −300 represents a very low probability in the log domain. The likelihood ratio is then calculated as follows:

If both (610) and (611) sub-graphs have the same probability: LR=L_in/L_out=1⇒low confidence.

Empty (611) sub-graph, (610) sub-graph with probability 1: LR=1/exp(−300)=exp(300)⇒high confidence on utterance transcription, in-domain command was spoken, process (execute an action) it on the device.

Empty (610) sub-graph, (611) sub-graph with probability 1: LR=exp(−300)/1=exp(−300)⇒low confidence on utterance transcription, further post-processing in the cloud is recommended.

The output (612) is thus a value (−∞,∞), with a binary edge at 1 (that represents that both in and out domain paths are equally probable). Setting a binary decision on-device processing if LR>1 is a good starting point, but different tuning strategies are desirable. For example, a threshold could be chosen as having an equal error rate for optimal classification of in vs. out-domain decisions.

An equal error rate is an algorithm used to predetermine the threshold values for its false acceptance rate and its false rejection rate. When the rates are equal, the common value is referred to as the equal error rate. The value indicates that the proportion of false acceptances is equal to the proportion of false rejections. The lower the equal error rate value, the higher the accuracy of the system.

The final step that takes the final decision is a controller 613. The controller 613 can take the LR (612) and other available factors such as the length of audio (input spoken query), time delay or the local processing, availability of the network, etc. to either to accept the local processing results (612) or to forward the query to the cloud.

Confidence Metrics

Embodiments provide a method for producing reliable confidence measures for a command spotter operating, for example, in a consumer electronics device. Reliable confidence measures are fundamental in the design of a hybrid speech recognition (ASR) system capable of decision-making tasks such as handover, e.g., to decide when to operate in-device or in the cloud. One implementation of these confidence measures uses the Kaldi speech recognition toolkit framework (See Daniel Povey, Arnab Ghoshal, Gilles Boulianne, Lukas Burget, Ondrej Glembek, Nagendra Goel, Mirko Hannemann, Petr Motlicek, Yanmin Qian, Petr Schwarz, Jan Silovsky, Georg Stemmer, and Karel Vesely. The Kaldi speech recognition toolkit. In IEEE 2011 Workshop on Automatic Speech Recognition and Understanding. IEEE Signal Processing Society, December 2011. IEEE Catalog No.: CFP11SRW-USB.). This toolkit provides confidence measures specifically designed for large-vocabulary speech processing systems. While used herein for large-vocabulary speech processing, these confidence measures perform poorly for small vocabulary speech processing systems such as the ones required by a command spotter herein.

Thus, in order to produce more reliable confidence measures, a likelihood ratio (LR) approach is used. This confidence measure can be obtained by computing the ratio of the score of an in-domain model capable of recognizing the commands on-device and, and the score from a filler model that can process the remaining (out-domain) utterances (See, e.g., Hervé Bourlard, Bart D'Hoore, and Jean Marc Boite. Optimizing recognition and rejection performance in word spotting systems. ICASSP, IEEE Int. Conf. Acoust. Speech Signal Process.—Proc., 1:1373-1376, 1994. ISSN 15206149). Instead of using the conventional way of modifying the decoder to track the two paths (in and out domain models), embodiments of the present invention calculate the likelihood ratio not in the decoder, but in a subsequent step, a decoding lattice post-processing. The implementation of one embodiment within Kaldi's framework uses processing of weighted finite state transducers (WFSTs). See, e.g., Mehryar Mohri, Fernando Pereira, and Michael Riley. Speech Recognition with Weighted Finite-State Transducers. Springer Handb. Speech Process., pages 559-584, 2008 ("Mohri 2008").

The decoding lattice post-processing is a set of efficient mathematical operations The ASR system uses Weighted Finite State Transducers. The IN-domain and OUT-domain filters are then partial WFST graphs, as shown in FIG. 6. They are constructed during a training phase during language model training (from in and out domain tokens (text) as shown in FIG. 6. The LR is then calculated:

1. I=WFST composition of decoding lattice and IN-domain filter; result is a WFST.
2. O=WFST composition of decoding lattice and OUT-domain filter; result is a WFST.
3. LR=ratio of the shortest-path probabilities through I and O.

Figure 7A:
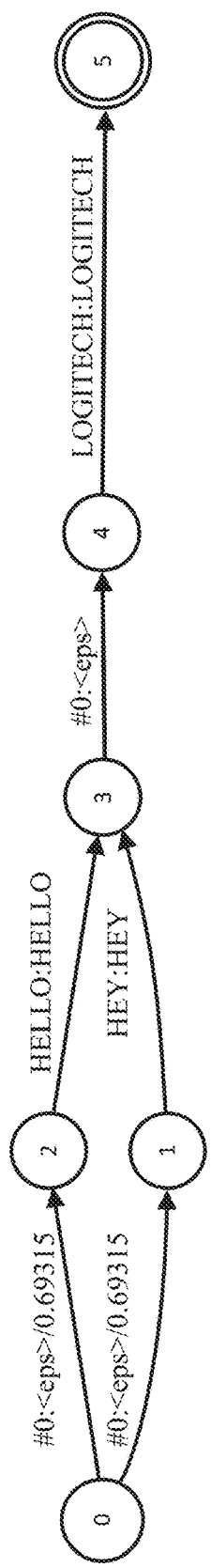
FIGS. 7A-C shows examples of WFST graphs for a simplified grammar of a command spotter, according to embodiments.
Figure 7B:
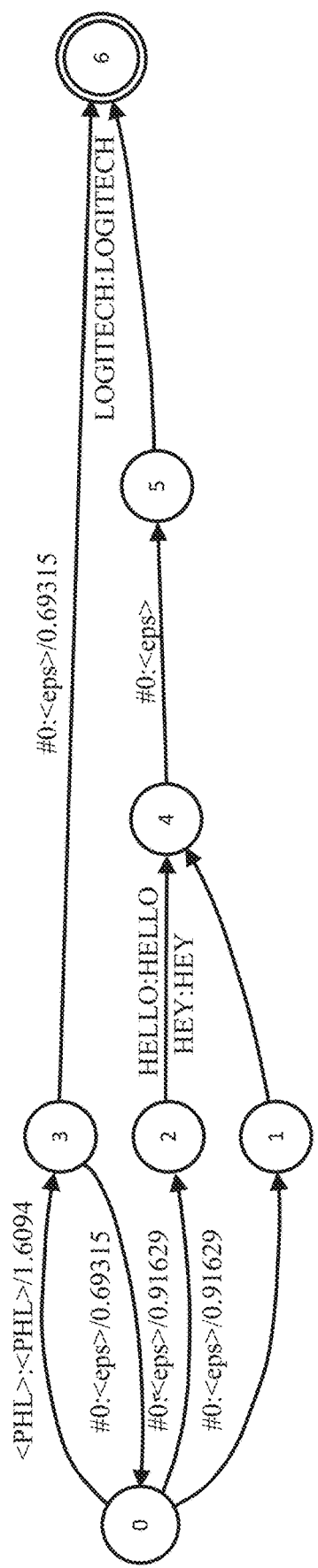
Figure 7C:
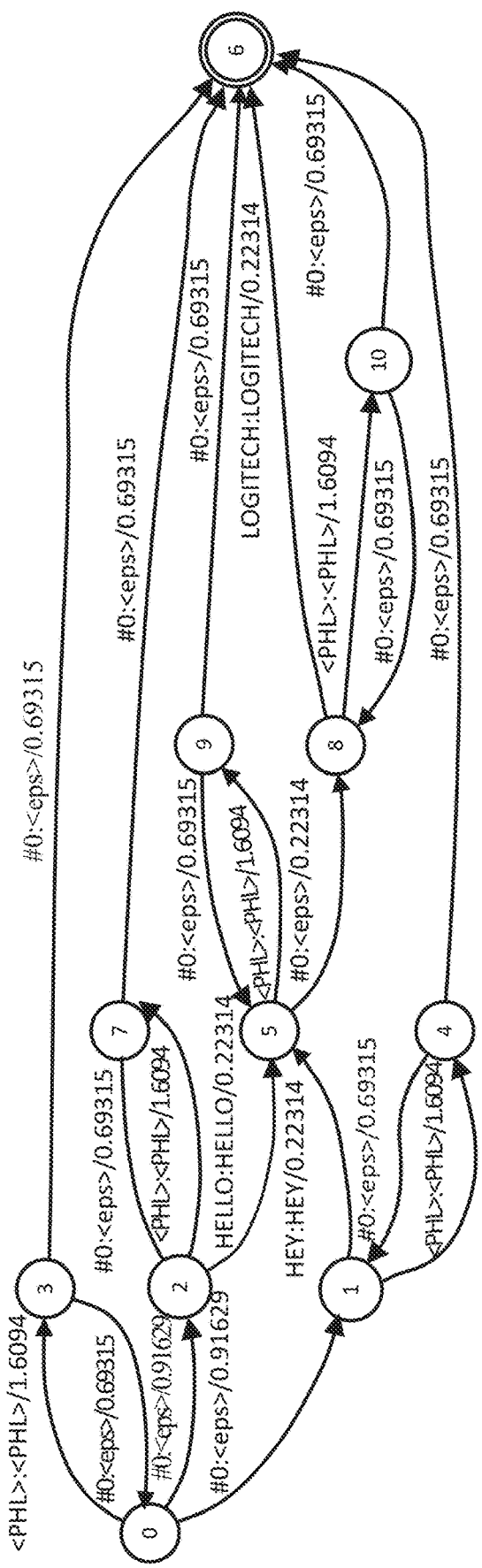

FIGS. 7A-C provide examples of grammars of a command spotter. <eps> and #0 are the null and disambiguating symbols respectively (see Mohri 2008 for details). The arc labels represent "input symbol":"output symbol"/"weight", where weight stands for negative log-probability. Additional <eps> arcs are present: these are artifacts created by the conversion from Moore to Mealy machines due to the fact that HTK's HParse command was used to construct this grammar (See Steve Young, Evermann Gunnar, Gales Mark, Thomas Hain, and Dan Kershaw (HTK is a Hidden Markov Model Tool Kit). The HTK Book version 3.5 alpha, March 2009, 2015). The grammar weight is 0.8 corresponding to a negative log-probability of 0.22314. The grammar weight is an input parameter used to create SPL (Single Phone Loop) or MLP (Multiple Phone Loop). The grammar weight impacts overall performance, and may be tuned with metrics mentioned above, such as EER. The following discussion refers to the different topologies as:

(a) grammars for grammars without any loop (FIG. 7A),
(b) single phone loop (SPL) grammars for grammars with a single phone loop (FIG. 7B) and
(c) multi-phone loop (MPL) grammars for grammars with multiple phone loops (FIG. 7C).

FIG. 7A shows an example of a simplified grammar of a command spotter that can recognize the commands "Hey Logitech" and "Hello Logitech". This graph is a WFST, meaning its arcs can have input and output symbols and weights. See Mohri 2008 for a detailed overview. An ASR system based on this grammar is constrained to output only the allowed commands. As results will later show, Kaldi's state-of-the-art confidence measures on such small grammars are not reliable, meaning that utterances with completely different transcriptions will be labeled as the allowed commands with an erroneous high confidence score. In order to avoid this, a garbage model is needed which here is implemented as a phone loop capable of representing all possible speech components. This can be achieved by introducing a new symbol in the lexicon and assigning the new symbol pronunciations using each phone used in the lexicon.

FIG. 7B shows the resulting WFST adding such a phone loop (indicated as <PHL>) to the grammar of FIG. 7A. A parallel branch is attached to the original grammar, meaning this can "trap" the word sequence output between the initial node 1 and node 3 modeling out-domain commands with repetitions of the symbol <PHL>. In general, the probability of being trapped inside the phone loop is unknown. Embodiments tune this using a grid search approach and refer to this hyper-parameter as grammar weight (GW), that is the probability of having a command.

FIG. 7C shows a more advanced topology. Instead of using a single phone loop at the beginning of the grammar, this topology allows entering phone loops after each word. This gives more flexibility in the possible choices the decoder can make. Here, the GW is the same for each branching.

Figure 8A:
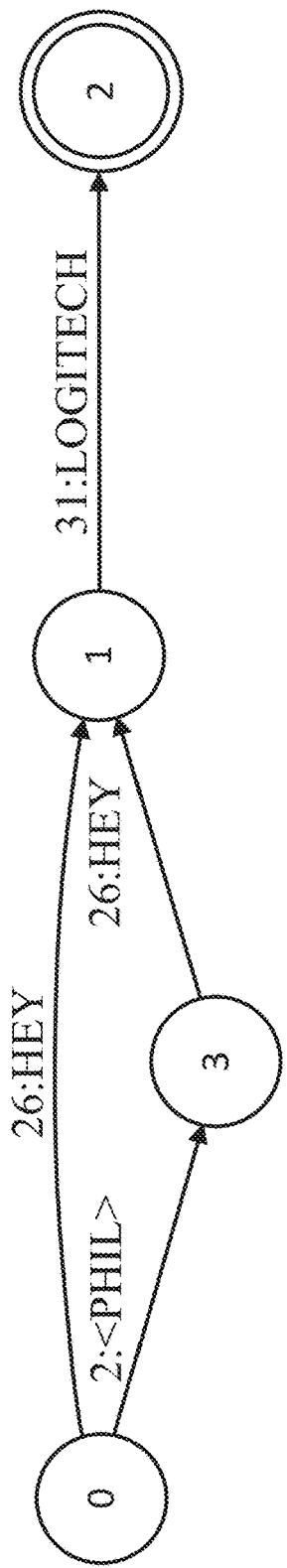
FIGS. 8A-B are examples of lattices using different types of grammars, according to an embodiment.
Figure 8B:
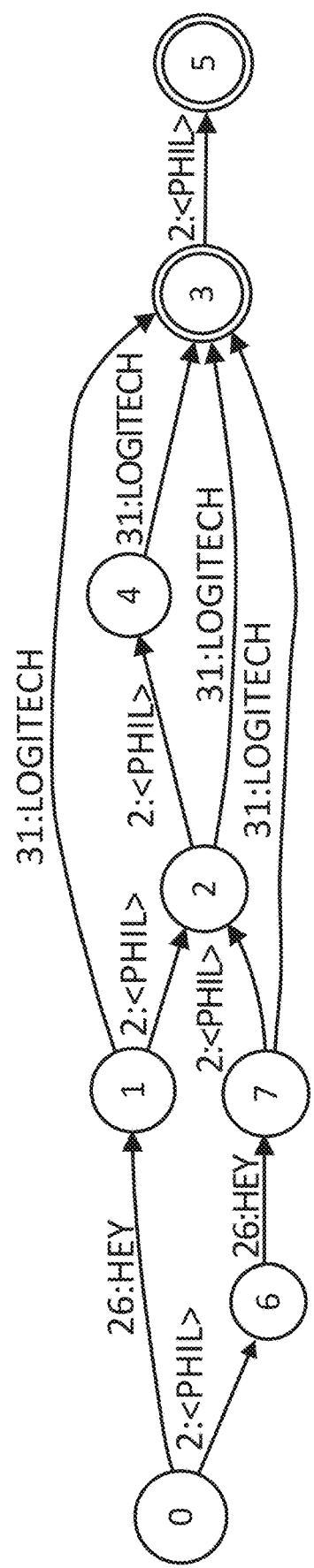

FIGS. 8A-B are examples of lattices obtained for the utterance "Hey Logitech" using different types of grammars. Final nodes indicated by double circles. Numbers in the output symbols should be ignored (they are artifacts of the scripts used for the figure generation). Weights are not shown for brevity.

Computing Likelihood Ratio Using Lattices

A Kaldi decoder is largely based on WFST operations. Its decoder converts audio features into lattices using a particular language model. In the case of a command spotter, a grammar (JSFG format) or n-gram (ARPA format) model can be used as the language model. The resulting lattices consist of word graphs which are essentially WFSTs: input and output labels consist of the same words and their corresponding weights contain acoustic and language model scores together with their alignments. Examples of lattices are shown in FIGS. 8A and 8B where SPL and MPL (Multiple SPL) grammars are used respectively.

In order to compute a confidence measure, one embodiment splits these lattices between what is allowed by the command grammar and what is not, i.e. the phone loops. Such splitting can be conveniently performed using one of the basic operations of WFSTs or composition (E.g., Mohri 2008). Two WFST filters are constructed, one formed by all the words in the lexicon I, and the other formed by the symbol <PHL>0.

Figure 9A:
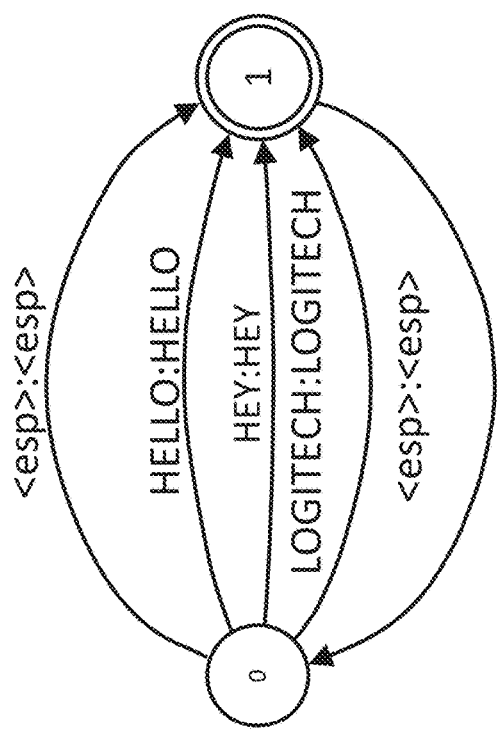
FIGS. 9A-B are diagrams of the topology of WFST filters, according to an embodiment.
Figure 9B:
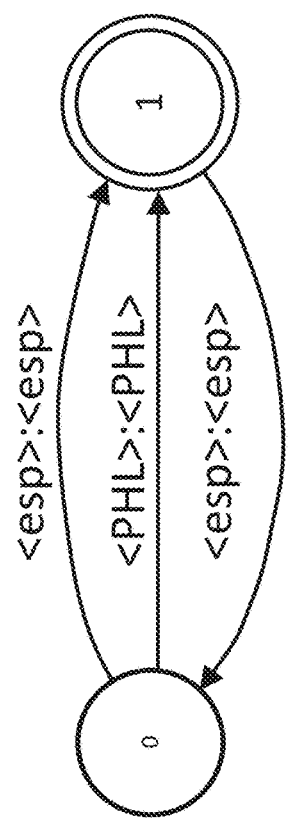

FIGS. 9A-B are diagrams illustrating the topology of these WFST filters. By denoting by L the WFST of a lattice obtained from the decoder, this can be split into $L_i = I \cdot L$ which will contain all the complete paths allowed by the command grammar (complete means paths must begin from an initial node and reach a final node). The likelihood ratio is then computed as follows:

$$C_{LR} = \frac{\omega(\pi_i)}{\omega(\pi_o)},$$

where $\pi_i$ and $\pi_o$ are the shortest-paths through the lattices L_in and L_out respectively and $\omega$ is a function that returns the path probability. When $\pi = \emptyset$, for example when one of the split lattices is empty, $\omega$ returns a probability close to 0.

Experimental Test Results

A "Logitech Command and Control dataset" was used to evaluate the confidence measures. This dataset consists of 739 commands recorded for 15 native and non-native English speakers. The dataset was split such that there were 300 utterances for the in-domain (categories "Wake up", "Services", "General media",) and 439 for out-domain (categories "Intro", "Music", "Entertainment", "Smart home", "Virtual assistant"). This dataset is referred to as "logi clean". Noise and reverberation were added using 5 different conditions to augment the dataset referred to as "logi". The evaluation used a state-of-the-art neural network based acoustic model trained using Librispeech (See Vassil Panayotov, Guoguo Chen, Daniel Povey, and Sanjeev Khudanpur. Librispeech: an ASR corpus based on public domain audio books. In 2015 IEEE International Conference on Acoustics, Speech and Signal Processing (ICASSP), pages 5206-5210. IEEE, 2015) following the standard Kaldi recipe (5.16 word error rate (WER) in a Librispeech clean test set using trigram language model). For all of the experiments reported here the acoustic weight (also known as fudge factor) was set to the one that reaches best ASR performance.

For the evaluation the following were considered: an utterance was labeled as a positive sample (recognized command) only if the decoded transcription (after removal of any <PHL> symbol) perfectly matched the ground truth transcription. Although WERs are typically used for evaluation in ASR, given the nature of the corpus and the simplicity of the grammar used, this choice introduced a negligible number of false negatives.

Firstly, the evaluation considered an "ad-hoc" grammar using HTK HFParse which included all the commands appearing in the INT corpus and also allowed for variations that were not present in the corpus (e.g. different numbers not appearing in the corpus). Tables 1 and 2 show various figures of merit obtained using the different grammars and confidence measures discussed earlier under this scenario. When phone loops are present the system is evaluated using different GWs. The figures of merit are shown below. Note that in the tables below, in-domain is alternately described as INT (In-Text), and out-domain as OOT (Out Of Text).

TABLE 1

Figures of merit for "clean logi" dataset with "ad-hoc" grammar (HTK). Arrows indicate if the figure of merit should be either larger or smaller for better performance.

| CM | GW | AUROC ↑ | AUPR ↑ | FPR@95TPR ↑ | F1@95TPR ↑ | INT ACC ↑ |
|---|---|---|---|---|---|---|
| MBR | 1.000 | 0.575 | 0.722 | 0.850 | 0.615 | 0.997 |
| MBR SLP | 0.700 | 0.518 | 0.949 | 0.953 | 0.932 | 0.850 |
|  | 0.800 | 0.553 | 0.962 | 0.923 | 0.941 | 0.930 |
|  | 0.900 | 0.572 | 0.934 | 0.918 | 0.910 | 0.950 |
| MBR MLP | 0.700 | 0.657 | 0.784 | 0.759 | 0.703 | 0.990 |
|  | 0.800 | 0.626 | 0.764 | 0.746 | 0.692 | 0.993 |
|  | 0.900 | 0.636 | 0.748 | 0.687 | 0.674 | 0.993 |
| LR SLP | 0.700 | 0.997 | 0.993 | 0.010 | 0.968 | 0.837 |
|  | 0.800 | 0.997 | 0.994 | 0.006 | 0.974 | 0.920 |
|  | 0.900 | 0.997 | 0.994 | 0.007 | 0.977 | 0.940 |
| LB MLP | 0.700 | 0.998 | 0.997 | 0.005 | 0.986 | 0.990 |
|  | 0.800 | 0.999 | 0.998 | 0.002 | 0.995 | 0.997 |
|  | 0.900 | 0.998 | 0.997 | 0.005 | 0.993 | 0.993 |

TABLE 2

Figures of merit for full "logi" dataset with "ad-hoc" grammar (HTK).

| CM | GW | AUROC ↑ | AUPR ↑ | FPR@95TPR ↑ | F1@95TPR ↑ | INT ACC ↑ |
|---|---|---|---|---|---|---|
| MBR | 1.000 | 0.579 | 0.714 | 0.836 | 0.602 | 0.961 |
| MBR SLP | 0.700 | 0.489 | 0.887 | 0.960 | 0.884 | 0.673 |
|  | 0.800 | 0.522 | 0.906 | 0.944 | 0.893 | 0.807 |
|  | 0.900 | 0.554 | 0.864 | 0.922 | 0.836 | 0.853 |
| MBR MLP | 0.700 | 0.622 | 0.716 | 0.868 | 0.617 | 0.757 |
|  | 0.800 | 0.636 | 0.719 | 0.772 | 0.614 | 0.803 |
|  | 0.900 | 0.632 | 0.714 | 0.698 | 0.615 | 0.845 |
| LR SLP | 0.700 | 0.985 | 0.951 | 0.045 | 0.919 | 0.640 |
|  | 0.800 | 0.983 | 0.956 | 0.059 | 0.918 | 0.773 |
|  | 0.900 | 0.973 | 0.568 | 0.090 | 0.891 | 0.783 |
| LR MLP | 0.700 | 0.954 | 0.782 | 0.047 | 0.928 | 0.795 |
|  | 0.800 | 0.957 | 0.834 | 0.055 | 0.923 | 0.827 |
|  | 0.900 | 0.938 | 0.641 | 0.090 | 0.907 | 0.825 |

AUROC is the Area Under the Receiver Operating Characteristic curve (AUROC). The ROC curve (See Tom Fawcett. An introduction to roc analysis. Pattern Recognition Letters, 27(8):861-874, 2006) is the plot between true positive rate (TPR) and false positive rate (FPR) at different operating points of the command spotter. The larger area under this curve implies more robust command spotters.

AUPR is the Area Under the Precision-Recall curve (AUPR). Similarly, the PR curve is the plot between precision (TP/(TP+FP)) and recall (TP/(TP+FN)) at different operating points The precision-recall plot is more informative than the ROC plot when evaluating binary classifiers on imbalanced datasets.

FPR@95TPR (95%) gives a measure of the possibility of out-domain utterance being interpreted as an in-domain utterance, i.e. the false positive rate (FPR), when the true positive rate (TPR) is 95%.

IN-domain detection accuracy is the accuracy achieved by the decoding in the in-domain dataset. Notice that this figure of merit is independent of the confidence score. It does account for samples that are rejected due to low confidence scores despite their transcriptions matching the ground truth. It gives a hint of the balance between positive and negative samples. For example, AUROC is not a reliable figure of merit when negative and positive samples are heavily unbalanced.

The first line of entries in tables 1 and 2 represents confidence measures obtained with a state-of-the-art decoder based on MBR, without adding any phone loop added to the grammar, meaning GW equals 1. As can be seen, the INT (in-domain) accuracy is the highest in this case for both clean and augmented data. However, the other figures of merit are rather poor. This is due to the fact that for most of the out-domain utterances a high confidence measure is reached for the wrong predictions. The performances do not particularly change when phone loops are used in the grammar, suggesting that this confidence measure is not well suited for a limited set command spotter.

On the other hand, the confidence measure based on the likelihood ratio of the present invention performs well on both clean and augmented datasets. Almost perfect results are reached in the clean dataset and a relative degradation is seen in the augmented data results. When the MPL grammar is used better in-domain accuracies are reached. This is due to the fact that MPL grammar offers more flexibility in creating lattices where the command is more likely to appear.

Such an effect can also be seen when comparing the lattices of FIGS. 8A-B. The GW does not seem to play a fundamental role, at least in the range tested. In general, a GW of 0.8 gives the better trade-off between in-domain accuracy and the other figures of merit, although this could change substantially if a different grammar is used.

TABLE 3

Figures of merit for "clean logi" dataset with 2-gram grammar.

| CM | GW | AUROC ↑ | AUPR ↑ | FPR@95TPR ↑ | F1@95TPR ↑ | INT ACC ↑ |
|---|---|---|---|---|---|---|
| MBR | 1.000 | 0.651 | 0.747 | 0.698 | 0.661 | 0.997 |
| MBR MLP | 0.700 | 0.690 | 0.796 | 0.706 | 0.714 | 0.990 |
| | 0.800 | 0.691 | 0.780 | 0.616 | 0.714 | 0.993 |
| | 0.900 | 0.693 | 0.765 | 0.570 | 0.703 | 0.993 |
| LR MLP | 0.700 | 0.983 | 0.978 | 0.002 | 0.983 | 0.993 |
| | 0.800 | 0.992 | 0.978 | 0.005 | 0.993 | 0.990 |
| | 0.900 | 0.992 | 0.972 | 0.007 | 0.993 | 0.993 |

TABLE 4

Figures of merit for full "logi" dataset with 2-gram grammar.

| CM | GW | AUROC ↑ | AUPR ↑ | FPR@95TPR ↑ | F1@95TPR ↑ | INT ACC ↑ |
|---|---|---|---|---|---|---|
| MBR | 1.000 | 0.681 | 0.738 | 0.631 | 0.648 | 0.913 |
| MBR MLP | 0.700 | 0.640 | 0.711 | 0.870 | 0.609 | 0.699 |
| | 0.800 | 0.662 | 0.717 | 0.806 | 0.594 | 0.751 |
| | 0.900 | 0.669 | 0.713 | 0.650 | 0.611 | 0.802 |
| LR MLP | 0.700 | 0.880 | 0.762 | 0.391 | 0.680 | 0.778 |
| | 0.800 | 0.878 | 0.696 | 0.492 | 0.624 | 0.763 |
| | 0.900 | 0.869 | 0.645 | 0.629 | 0.571 | 0.771 |

Tables 3 and 4 show the same results using a language model instead of an "ad-hoc" grammar like in the previous experiments. Only the MPL results are shown here for brevity since similar performances are reached in the SPL case. This language model is obtained by training a 2-gram directly on the INT (in-domain) Logitech corpus. Notice that this was done only to see the impact of using a simple 2-gram model. In general, evaluating on the training data should be avoided and moreover the Logitech corpus is quite small. Using a different and larger corpus would be more appropriate here, however some interesting features are observed. Table 4 shows the evaluation results on clean data. As in the previous experiments with the "ad-hoc" grammar, the likelihood ratio approach outperforms the MBR decoder and the very same conclusions of the previous experiments can be drawn. However, unlike in the case of the "ad-hoc" grammar with noisy data, in Table 4 there is not such a huge gap between MBR and the likelihood ratio approach, although the latter still achieves the best performances. The reason lies in the fact that in this case the 2-gram model is "less constrained" compared to the "ad-hoc" grammar: the 2-gram model allows for single words composing the commands to be recognized and it also has a self-loop, i.e. commands can be concatenated for infinitely many times. In practice this means that many more in-task paths are possible, meaning that the best path through the INT lattices will have lower scores, resulting in less certain confidence measures. It should be noted that the acoustic model employed is not specifically trained to be robust against noise and that if this were the case we would certainly see a larger gap when compared to the MBR decoder.

Alternate Embodiments

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A method for voice command processing, comprising:
    obtaining digitized audio representing audio captured from a microphone;
    decoding, by a local processor, the digitized audio to generate a plurality of audio features;
    applying the plurality of audio features to an in-domain model, stored in a memory, trained by a limited set of peripheral device commands;
    applying the plurality of audio features to an out-domain model, stored in the memory and trained by a broader audio set excluding the peripheral device commands;
    calculating an in-domain confidence score corresponding to the in-domain model;
    calculating an out-domain confidence score corresponding to the out-domain model;
    based on the in-domain and out-domain confidence scores, obtaining an audio command by either, but not both, of
        (i) processing the plurality of audio features with the local processor using a local speech recognition module, or
        (ii) sending the plurality of audio features to a remote server for processing; and
    performing an action in a peripheral device in accordance with the audio command.

2. The method of claim 1 further comprising calculating a likelihood ratio of the in-domain and out-domain confidence scores, wherein the likelihood ratio is calculated using an Automatic Speech Recognition (ASR) process combining statistical and machine learning models.

3. The method of claim 2 wherein the statistical model is at least one Hidden Markov Model (HMM) and the machine learning model is at least one Deep Neural Network (DNN).

4. The method of claim 1 where sending the plurality of audio features to a remote server comprises sending features including bottleneck features, d-vectors, and phone posterior probabilities.

5. The method of claim 1 further comprising:
using machine learning to train an in-domain weighted finite state (WFST) graph with in-domain commands, and an out-domain WFST graph with other words;
using machine learning to train a language model;
transforming the language model into a language model decoding graph;
performing automatic speech recognition (ASR) on the audio features using the language model decoding graph; and
using an output of the ASR and the in-domain and out-domain WFST graphs for calculating the in-domain and out-domain confidence scores.

6. The method of claim 5 wherein the language model decoding graph is a weighted finite state (WFST) graph.

7. The method of claim 5 further comprising:
providing the output of the ASR to a decoding lattice representing a most probable output word sequences; and
providing the output of the decoding lattice to a decoding WFST graph containing the most probable output word sequences, with associated probabilities for each word.

8. The method of claim 7, further comprising:
performing a Finite State Transducer (FST) composition of the decoding WFST graph and an in-domain pre-trained graph to generate a decoding sub-graph composed only of in-domain words; and
performing a Finite State Transducer (FST) composition of the decoding WFST graph and an out-domain pre-trained graph to generate a decoding sub-graph composed of phone loop sequences.

9. The method of claim 7 wherein the confidence scores comprise the shortest paths through decoding WFST graphs.

10. The method of claim 1 wherein the method is performed in the peripheral device.

11. A method for voice command processing, comprising:
obtaining digitized audio representing audio captured from a microphone;
decoding, by a local processor, the digitized audio to generate a plurality of audio features;
applying the plurality of audio features to an in-domain model, stored in a memory, trained by a limited set of peripheral device commands;
applying the plurality of audio features to an out-domain model, stored in the memory and trained by a broader audio set excluding the peripheral device commands;
calculating an in-domain confidence score corresponding to the in-domain model, wherein the model includes a phone loop that incorporates phones in at least one language;
calculating an out-domain confidence score corresponding to the out-domain model;
calculating a likelihood ratio of the in-domain and out-domain confidence scores, wherein the likelihood ratio is calculated using an Automatic Speech Recognition (ASR) process combining statistical and machine learning models;
based on the likelihood ratio, obtaining an audio command by either, but not both, of
(i) processing the plurality of audio features with the local processor using a local speech recognition module, or
(ii) sending the plurality of audio features to a remote server for processing; and
performing an action in a peripheral device in accordance with the audio command.

12. An apparatus for voice command processing in a peripheral device, comprising:
a processor;
a memory;
an audio module for obtaining digitized audio representing audio captured from a microphone;
a feature generation module for decoding the digitized audio to generate a plurality of audio features;
non-transitory, computer readable media, executable by the processor to
apply the plurality of audio features to an in-domain model, stored in a memory, trained by a limited set of peripheral device commands;
apply the plurality of audio features to an out-domain model, stored in the memory and trained by a broader audio set excluding the peripheral device commands;
calculate an in-domain confidence score corresponding to the in-domain model;
calculate an out-domain confidence score corresponding to the out-domain model;
based on the in-domain and out-domain confidence scores, obtaining an audio command by either, but not both, of
(i) processing the plurality of audio features in the apparatus with a local speech recognition module, or
(ii) sending the plurality of audio features to a remote server for processing; and
perform an action in the peripheral device in accordance with the audio command.

13. The apparatus of claim 12 wherein the non-transitory, computer readable media is further configured for calculating a likelihood ratio of the in-domain and out-domain confidence scores, wherein the likelihood ratio is calculated using an Automatic Speech Recognition (ASR) process combining statistical and machine learning models.

14. The apparatus of claim 13 wherein the statistical model is at least one Hidden Markov Model (HMM) and the machine learning model is at least one Deep Neural Network (DNN).

15. The apparatus of claim 12 where sending the plurality of audio features to a remote server comprises sending features including bottleneck features, d-vectors, and phone posterior probabilities.

16. The apparatus of claim 12 wherein the non-transitory, computer readable media is further configured for:
using machine learning to train an in-domain weighted finite state (WFST) graph with in-domain commands, and an out-domain WFST graph with other words;
using machine learning to train a language model;
transforming the language model into a language model decoding graph;
performing automatic speech recognition (ASR) on the audio features using the language model decoding graph; and
using an output of the ASR and the in-domain and out-domain WFST graphs for calculating the in-domain and out-domain confidence scores.

17. The apparatus of claim 16 wherein the language model decoding graph is a weighted finite state (WFST) graph.

18. The apparatus of claim 16 wherein the non-transitory, computer readable media is further configured for:
   providing the output of the ASR to a decoding lattice representing a most probable output word sequences; and
   providing the output of the decoding lattice to a decoding WFST graph containing the most probable output word sequences, with associated probabilities for each word.

19. The apparatus of claim 18 wherein the non-transitory, computer readable media is further configured for:
   performing a Finite State Transducer (FST) composition of the decoding WFST graph and an in-domain pre-trained graph to generate a decoding sub-graph composed only of in-domain words; and
   performing a Finite State Transducer (FST) composition of the decoding WFST graph and an out-domain pre-trained graph to generate a decoding sub-graph composed of phone loop sequences.

20. The apparatus of claim 18 wherein the confidence scores comprise the shortest paths through decoding WFST graphs.

* * * * *